US010370294B2

(12) United States Patent
Dighe et al.

(10) Patent No.: US 10,370,294 B2
(45) Date of Patent: Aug. 6, 2019

(54) SINGLE BLENDED CEMENT SYSTEM FOR USE AT WIDE RANGES OF DENSITY AND TEMPERATURES

(71) Applicants: Shailesh Shashank Dighe, Katy, TX (US); Shannon E. Bryant, Tomball, TX (US); Matthew Kellum, Spring, TX (US); Gregory D. Dean, Montgomery, TX (US); Antonio Bottiglieri, Houston, TX (US)

(72) Inventors: Shailesh Shashank Dighe, Katy, TX (US); Shannon E. Bryant, Tomball, TX (US); Matthew Kellum, Spring, TX (US); Gregory D. Dean, Montgomery, TX (US); Antonio Bottiglieri, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 24 days.

(21) Appl. No.: 15/839,938

(22) Filed: Dec. 13, 2017

(65) Prior Publication Data

US 2019/0177222 A1 Jun. 13, 2019

(51) Int. Cl.
*C09K 8/46* (2006.01)
*C04B 14/10* (2006.01)
*E21B 33/14* (2006.01)
*C04B 14/06* (2006.01)
*C04B 7/00* (2006.01)

(52) U.S. Cl.
CPC .............. *C04B 14/106* (2013.01); *C04B 7/00* (2013.01); *C04B 14/062* (2013.01); *C09K 8/46* (2013.01); *E21B 33/14* (2013.01)

(58) Field of Classification Search
CPC .......... C09K 8/46; E21B 33/14; C04B 14/062
USPC ........................................... 166/293
See application file for complete search history.

(56) References Cited

U.S. PATENT DOCUMENTS

| 6,562,122 | B2 * | 5/2003 | Dao ................. | C04B 7/527 |
| | | | | 106/705 |
| 9,321,953 | B1 * | 4/2016 | Ferrell, Jr. .......... | C09K 8/487 |
| 2011/0162845 | A1 * | 7/2011 | Ravi ................. | C04B 28/02 |
| | | | | 166/293 |
| 2012/0018155 | A1 * | 1/2012 | Patil ................. | C04B 28/04 |
| | | | | 166/293 |
| 2013/0312968 | A1 * | 11/2013 | Ladva ............... | C09K 8/68 |
| | | | | 166/293 |

OTHER PUBLICATIONS

Piklowska, Anna, "Cement slurries used in drilling—types, properties, application", WSN 76 (2017) 149-165.

\* cited by examiner

*Primary Examiner* — William D Hutton, Jr.
*Assistant Examiner* — Ashish K Varma
(74) *Attorney, Agent, or Firm* — Cantor Colburn LLP

(57) ABSTRACT

A method of cementing a wellbore penetrating a subterranean formation comprises blending a base cement slurry with one or more liquid additives to provide a cementing composition, the base cement slurry comprising a liquid carrier, a class G cement or a blend of class G and class C cements as defined by the American Petroleum Institute (API) Specification 10A standards (R2015), and silica fume, or fumed silica, or a combination of silica fume and fumed silica, the base cement slurry having a density of about 14 to about 16 ppg; and injecting the cementing composition into the wellbore. The single base cement slurry can be used globally to make cementing compositions having wide ranges of density and temperature stability.

15 Claims, No Drawings

SINGLE BLENDED CEMENT SYSTEM FOR USE AT WIDE RANGES OF DENSITY AND TEMPERATURES

BACKGROUND

In the oil and gas industry, cementing is a technique employed during many phases of borehole operations. For example, a cement slurry may be employed to cement or secure various casing strings and/or liners in a well. In other cases, cementing may be used in remedial operations to repair casing and/or to achieve formation isolation. In still other cases, cementing may be employed to isolate selected zones in the borehole and to temporarily or permanently abandon a borehole.

Portland cements have been used in the oil and gas industry. However, in order to meet the demands of a particular well application, Portland cements must often be admixed with various chemical compounds to customize the properties such as density, temperature stability, viscosity, and the like. Because of the complexity of the applications and demanding temperature and pressure conditions, the cement system design can be complex. For offshore operations having limited access to equipment and various individual additives, it can be cumbersome to design suitable cementing compositions that are tailored for specific well conditions.

Because of the extensive use of cement in the oil and gas industry, the art would be receptive to alternative materials and methods for cementing wellbores. It would be an advantage if the alternative materials can be conveniently manufactured while still producing comparable performance as conventional cements.

BRIEF DESCRIPTION

A method of cementing a wellbore penetrating a subterranean formation comprises blending a base cement slurry with one or more liquid additives to provide a cementing composition, the base cement slurry comprising a liquid carrier, a class G cement or a blend of class G and class C cements as defined by the American Petroleum Institute (API) Specification 10A standards (R2015), and silica fume, or fumed silica, or a combination of silica fume and fumed silica, the base cement slurry having a density of about 14 to about 16 ppg; and injecting the cementing composition into the wellbore.

Also disclosed is a base cement slurry, which can be blended with one or more liquid additives to provide a cementing composition. The base cement slurry comprises (1) a liquid carrier; (2) a class G cement and about 1 to 10 wt % of kaolinite clay based on the total weight of the cement base slurry, or a blend of class G and class C cements as defined by the American Petroleum Institute (API) Specification 10A standards (R2015), the weight ratio of the class G cement relate to the class C cement being about 5:1 to about 3:1; and (3) about 3 to about 7 wt % silica fume, or fumed silica, or a combination of silica fume and fumed silica, based on the total weight of the cement base slurry. The base cement slurry has a density of about 14 to about 16 ppg.

DETAILED DESCRIPTION

The inventors hereof have found that a single base cement slurry can be used globally to make cementing compositions having a density range of 11 to 18 ppg and a temperature stability range of 40 to 350° C. or 60 to 300° C. The cement compositions can be made by blending only limited number of liquid additives or liquid additive packages. The cementing compositions meet wellbore construction requirements, and are especially useful in offshore operations where the low number of components to the system will simplify logistics and slurry design.

The base cement slurry comprises a liquid carrier such as water, a class G cement or a combination of class G and class C cements as defined by the American Petroleum Institute (API) Specification 10A standards (R2015), and one or more of fumed silica or silica fume. The base slurry has a density of about 13 to about 15 pounds per gallon of the liquid carrier (ppg) or about 14 to 16 ppg, for example about 14.5 ppg. In an embodiment, the base cement slurry comprises about 5 to 15 wt %, 5 to 10 wt %, or 2 to 10 wt % of the fumed silica or silica fume or a combination thereof, based on the total weight of the base cement slurry.

As a specific example, the base cement slurry comprises a liquid carrier; a class G cement; about 1 to about 10 wt % or about 3 to 7 wt % such as about 5 wt % of kaolinite clay; and about 2 to about 10 wt % or about 3 to about 7 wt % such as about 5 wt % of fumed silica or silica fume or a combination thereof, each based on the total weight of the base cement slurry.

As another specific example, the base cement slurry comprises a liquid carrier; a blend of class G cement and a class C cement having a weight ratio of about 5:1 to about 3:1 such as about 4:1; and about 2 to about 10 wt % or about 3 to about 7 wt % such as about 5 wt % fumed silica or silica fume or a combination thereof, each based on the total weight of the base cement slurry.

In an embodiment the base cement slurry is free of silica sand and silica flour. If needed, a silica suspension liquid additive can be added to the base cement slurry to form a cement system that has desired cement performance in high temperature well environments.

The class G cement is obtained by grinding Portland cement clinker, consisting essentially of hydraulic calcium silicates, usually containing one or more forms of calcium sulfate as an interground additive. No additive other than calcium sulfate or water, or both, are interground or blended with the clinker during manufacture of class G cement. Class G cements are commercially available in various grades such as high sulfate resistant (HSR) and moderate sulfur resistant (MSR). In an embodiment, the class G cement is Dyckerhoff cement. An exemplary Dyckerhoff cement contains less than or equal to about 3 wt % of sulfur trioxide, less than or equal to about 6 wt % of magnesium oxide, less than or equal to about 0.75 wt % of insoluble residue, less than or equal to about 0.75 wt % of total alkali expressed at $Na_2O$, about 48 to about 58 wt % of tricalcium silicate, and less than or equal to about 8 wt % of tricalcium aluminate, each based on the total weight of the cement. Another exemplary Dyckerhoff cement contains less than or equal to about 3 wt % of sulfur trioxide, less than or equal to about 6 wt % of magnesium oxide, less than or equal to about 0.75 wt % of insoluble residue, less than or equal to about 0.75 wt % of total alkali expressed at $Na_2O$, about 48 to about 65 wt % of tricalcium silicate, and less than or equal to about 3 wt % of tricalcium aluminate, and less than or equal to about 24 wt % of tetracalcium aluminoferrite, each based on the total weight of the cement.

Class C cements are commercially available in ordinary, moderate sulfate resistant, and high sulfate resistant grades. A class C cement can contain less than or equal to about 6 wt % of magnesium oxide, less than or equal to about 4.5 wt % or less than or equal to about 3.5 wt % of sulfur trioxide, and less than or equal to about 0.75 wt % of insoluble residue, each based on the total weight of the cement. Ordinary grade class C cement has a maximum tricalcium aluminate content of about 15%, while moderate sulfate resistant and high sulfate resistant grades have a maximum tricalcium aluminate content of about 8 wt % or about 3 wt % respectively each based on the total weight of the cement.

Fumed silica is also known as pyrogenic silica because it is produced in a flame. Fumed silica comprises microscopic droplets of amorphous silica fused into branched, chainlike, three-dimensional secondary particles which then agglomerate into tertiary particles. Fumed silica can have a primary particle size of about 1 to about 100 nanometers or about 5 to about 50 nanometers. Fumed silica can have a surface area of about 50 to about 600 $m^2/g$. The density of fumed silica is about 150 to about 200 $kg/m^3$.

Silica fume is also known as microsilica. It is an amorphous polymorph of silica. Silica fume is an ultrafine material with spherical particles less than 1 micron in diameter. Silica fume is commercially available and can be produced from silicon and ferrosilicon alloy production as a byproduct.

To manufacture a cementing composition having a density that is greater than that of the base cement slurry, a heavy weight liquid additive can be added to the base cement slurry. The heavy weight liquid additive comprises cerium oxide or manganese oxide or a combination of cerium oxide and manganese; water; diutan gum; and optionally a dispersant such as a sulfonated organic polymer. The density of the heavy weight liquid additive is about 20 to about 24 ppg or about 19 to about 21 ppg. The heavy weight liquid additive can be present in the form of a dispersion.

Diutan gum is a high molecular weight gum produced by aerobic fermentation. It can be used as a superplasticizer. The heavy weight liquid additive can contain about 0.5 to about 2 wt % of diutan gum, based on the total amount of water in the heavy weight liquid additive.

As used herein, cerium oxide include cerium (IV) oxide. Alternatively or in addition to cerium oxide, the heavy weight liquid additive can contain manganese oxide. Cerium oxide and manganese oxide can be used as a weighting agent. The heavy weight liquid additive can contain about 100 to about 200 wt % of cerium oxide, by weight of water in the high weight liquid additive. In another embodiment, the heavy weight liquid additive includes about 300 to about 500 wt % of manganese oxide, by weight of water in the high weight liquid additive.

To manufacture a cementing composition having a density that is lower than that of the base cement slurry, a light weight liquid additive can be added to the base cement slurry. The light weight liquid additive comprises a glass sphere such as a sodium borosilicate glass sphere, diutan gum, and water. Optionally, the light weight liquid additive further comprises a dispersant. Exemplary dispersants include but are not limited to a sulfonated organic polymer. In an embodiment, the light weight liquid additive comprises about 30 to about 50 wt % or about 35 to about 45 wt % of glass sphere such as borosilicate glass sphere, and about 0.5 to about 2.0 wt % of diutan gum, by weight of water. The density of the light weight liquid additive is about 5 to about 7 ppg or about 5.5 to about 6.5 ppg, for example about 6 ppg. The light weight liquid additive can be in the form of a suspension.

Glass spheres are hollow spheres have a true specific gravity of about 0.1 to about 1, less than about 0.6 or about 0.31. Diameter of the glass spheres is about 10 to about 350 microns or about 50 to about 150 microns. The wall thickness is about 0.5 to about 2 microns. Glass spheres may be coated. Borosilicate glass is a type of glass with silica and boron trioxide as the main glass-forming constituents.

Exemplary optional sulfonated organic polymer includes but is not limited to sulfonated polyolefin, sulfonated fluorinated polyolefin, sulfonated polystyrene, sulfonated styrene maleic anhydride, sulfonated naphthalene formaldehyde condensate, ethoxylated napthalene formaldehyde condensate, sulfonated ketone-acetone formaldehyde condensate, sulfonated melamine formaldehyde condensate, acetone formaldehyde sulfate condensate, and the like.

To manufacture a cementing composition that can be used at high temperatures, a silica suspension liquid additive can be added to the base cement slurry. The silica suspension liquid additive comprises silica flour, silica sand, diutan gum, and water. In an exemplary embodiment, the silica suspension liquid additive comprises 20 to 40 wt % of the silica flour, 20 to 40 wt % of the silica sand, and 20 to 40 wt % of water, each based on the total weight of the silica suspension liquid additive. The silica suspension liquid additive allows the users to add silica only when needed for higher temperature applications. Because the base cement slurry does not contain silica sand or silica flour, the price of cementing composition for low temperature applications can be kept low.

Exemplary silica sand include sand grains. The sand grains can have a size from about 1 to about 2,000 μm, specifically about 10 to about 1,000 μm, and more specifically about 10 to about 500 μm. As used herein, the size of a sand grain refers the largest dimension of the grain.

Various other liquid additives can be added to further adjust the desired properties of the cement system. Additional optional additives include a retarder, accelerator, fluid loss additive, foam preventer, a buffering agent, or the like. Each additive can be present in amounts known generally to those of skill in the art. In an embodiment, no solid additive is added to the base cement slurry.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonates.

The pH of the cementing compositions is about 7 to about 13, about 7 to about 10, about 7 to about 9 or about 7 to about 8. A buffering agent can be optionally included in the cementing compositions. Exemplary buffering agents include 2-amino-2-hydroxmethyl-propane-1,3-diol (TRIS), phosphate, carbonate, histidine, BIS-TRIS propane, 3-(N-morpholino)propanesulfonic acid (MOPS), (4-(2-hydroxyethyl)-1-piperazineethanesulfonic acid (HEPES), 2-[[1,3-dihydroxy-2-(hydroxymethyl)propan-2-yl]amino] ethanesulfonic acid (TES), 4-(N-Morpholino) butanesulfonic acid (MOBS), 3-(N-morpholino) propanesulfonic acid (MOPS), 3-(N,N-Bis[2-hydroxyethyl] amino)-2-hydroxypropanesulfonic acid (DIPSO), N-Tris (hydroxymethyl)methyl]-3-amino-2-hydroxypropanesulfonic acid (TAPSO), triethanolamine (TEA), pyrophosphate, N-(2-Hydroxyethyl)piperazine-N'-(2-hydroxypropanesulfonic acid) (HEPPSO), piperazine-1,4-bis(2-hydroxypropanesulfonic acid) dehydrate (POPSO), tricine, glyccylglycine, bicine, N-[tris(hydroxymethyl) methyl]-3-aminopropanesulfonic acid (TAPS), taurine, ammonia, ethanolamine, glycineTRIS, piperazine-N,N'-bis (2-ethanesulfonic acid) (PIPES).

The solid content of the cementing compositions is about 20 to about 80 wt % based on the total weight of the cementing compositions, preferably about 50 to about 95 wt % based on the total weight of the cementing compositions.

The density of the cementing compositions can vary widely depending on the specific downhole conditions. Such densities can include about 11 up to about 18 ppg, preferably about 12 to 17 ppg.

EXAMPLES

A blend of class G cement (at 80%) and class C cement (at 20%), 5% to 10% fumed silica or silica fume, water, and optional other liquid additives such as retarders, dispersants and the like are mixed to provide a base cement slurry having a density of 14.5 ppg. The base slurry would provide a thickening time of 3 hours when tested at 200° F. allowing the cement to be pumped for 3 hours before turning into a solid. Once the cement slurry turned solid it would develop 2000 psi compressive strength after 24 hours.

The same base slurry would have a heavy weight liquid additive and silica suspension added to it at approximately 3 gallons per sack of cement and mixed to form a cement slurry having a density of 16 ppg. This slurry would provide similar thickening times and develop higher compressive strengths when subjected to higher temperatures (300° F. for example) in the wellbore.

Set forth are various embodiments of the disclosure.

Embodiment 1

A method of cementing a wellbore penetrating a subterranean formation, the method comprising: blending a base cement slurry with one or more liquid additives to provide a cementing composition, the base cement slurry comprising a liquid carrier; a class G cement or a combination of a class G and class C cements as defined by the American Petroleum Institute (API) Specification 10A standards (R2015); silica fume, or fumed silica, or a combination of silica fume and fumed silica, the base cement slurry having a density of about 14 to about 16 ppg; and injecting the cementing composition into the wellbore.

Embodiment 2

The method of Embodiment 1, wherein the base cement slurry comprises about 1 to about 10 wt % of the fumed silica or silica fume or a combination of the fumed silica and silica fume, each based on the total weight of the base cement slurry.

Embodiment 3

The method of any one of the preceding embodiments, wherein the base cement slurry comprises water, class G cement, about 1 to about 10 wt % of kaolinite clay, and about 3 to 7 wt % of silica fume or fumed silica or a combination thereof, each based on the total weight of the base cement slurry.

Embodiment 4

The method of any one of the preceding embodiments, wherein the base cement slurry comprises water, a blend of class G and class C cements having a weight ratio of about 5:1 to about 3:1, and about 3 to 7 wt % of silica fume or fumed silica or a combination thereof, each based on the total weight of the base cement slurry.

Embodiment 5

The method of any one of the preceding embodiments, wherein the base cement slurry is free of silica sand and silica flour; and the base cement slurry is blended with a silica suspension liquid additive in an amount such that the cementing composition has a target cement performance in a high temperature well environment.

Embodiment 6

The method of any one of the preceding embodiments, wherein liquid additives comprise a light weight liquid additive, a heavy weight liquid additive, or a silica suspension liquid additive.

Embodiment 7

The method of any one of the preceding embodiments, wherein the heavy weight liquid additive comprises cerium oxide, manganese oxide, or a combination thereof; water; diutan gum; and optionally a dispersant.

Embodiment 8

The method of any one of the preceding embodiments, wherein the heavy weight liquid additive has a density of about 20 to about 24 ppg.

Embodiment 9

The method of any one of the preceding embodiments, wherein the heavy weight liquid additive comprises about 100 to about 200 wt % of cerium oxide and about 0.5 to 2 wt % of diutan, each by weight of the water in the heavy weight liquid additive.

Embodiment 10

The method of any one of the preceding embodiments, wherein the heavy weight liquid additive comprises about 300 to about 500 wt. % of manganese oxide and 0.5 to 2 wt % of diutan, each by weight of the water in the heavy weight liquid additive.

Embodiment 11

The method of any one of the preceding embodiments, wherein the light weight liquid additive comprises a glass sphere, diutan gum, water, and optionally a dispersant.

Embodiment 12

The method of any one of the preceding embodiments, wherein the glass sphere is a borosilicate glass sphere.

Embodiment 13

The method of any one of the preceding embodiments, wherein the light weight liquid additive has a density of about 5 to about 7 ppg.

Embodiment 14

The method of any one of the preceding embodiments, wherein the light weight liquid additive comprises about 30 to about 50 wt % of the glass sphere, about 0.5 to about 2 wt % of diutan gum, and optionally a dispersant, by weight of the water in the light weight liquid additive.

Embodiment 15

The method of any one of the preceding embodiments, wherein the silica suspension liquid additive comprises silica flour, silica sand, diutan gum, and water.

Embodiment 16

The method of any one of the preceding embodiments, wherein the silica suspension liquid additive comprises 20 to 40 wt % of the silica flour, 20 to 40 wt % of the silica sand, and 20 to 40 wt % of water, each based on the total weight of the silica suspension liquid additive.

Embodiment 17

The method of any one of the preceding embodiments, wherein the liquid additive further comprises a retarder, accelerator, fluid loss additive, foam preventer, or a buffering agent.

Embodiment 18

The method of any one of the preceding embodiments, wherein the base cement slurry is not directly blended with any solid additive.

Embodiment 19

The method of any one of the preceding embodiments, wherein the cementing composition has a density of about 11 to about 18 ppg.

Embodiment 20

The method of any one of the preceding embodiments, wherein the cementing composition has a temperature stability range of about 40° C. to about 350° C.

Embodiment 21

A cement base slurry comprising a liquid carrier; a class G cement and about 1 to 10 wt % of kaolinite clay based on the total weight of the cement base slurry, or a blend of class G and class C cements as defined by the American Petroleum Institute (API) Specification 10A standards (R2015), the weight ratio of the class G cement relate to the class C cement being about 5:1 to about 3:1; and about 3 to about 7 wt % silica fume, or fumed silica, or a combination of silica fume and fumed silica, based on the total weight of the cement base slurry, the base cement slurry having a density of about 14 to about 16 ppg.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of cementing a wellbore penetrating a subterranean formation, the method comprising:
   blending a base cement slurry with one or more liquid additives to provide a cementing composition,
   the base cement slurry comprising
   a liquid carrier;
   a class G cement or a combination of a class G and class C cements;
   silica fume, or fumed silica, or a combination of silica fume and fumed silica,
   the base cement slurry having a density of 14 to 16 ppg; and
   injecting the cementing composition into the wellbore,
   wherein the one or more of the liquid additives comprise a heavy weight liquid additive comprising (1) about 100 to about 200 wt % of cerium oxide; or about 300 to about 500 wt % of manganese oxide, (2) water; and (3) 0.5 to 2 wt % of a diutan gum, each by weight of the water in the heavy weight liquid additive, the heavy weight liquid additive having a density of about 20 to about 24 ppg.

2. The method of claim 1, wherein the base cement slurry comprises about 1 to about 10 wt % of the fumed silica or silica fume or a combination of the fumed silica and silica fume, each based on the total weight of the base cement slurry.

3. The method of claim 2, wherein the base cement slurry comprises water, class G cement, about 1 to about 10 wt % of kaolinite clay, and about 3 to 7 wt % of silica fume or fumed silica or a combination thereof, each based on the total weight of the base cement slurry.

4. The method of claim 2, wherein the base cement slurry comprises water, a blend of class G and class C cements having a weight ratio of about 5:1 to about 3:1, and about 3 to 7 wt % of silica fume or fumed silica or a combination thereof, each based on the total weight of the base cement slurry.

5. The method of claim 1, wherein the heavy weight liquid additive further comprises a dispersant.

6. The method of claim 1, wherein the heavy weight liquid additive comprises about 100 to about 200 wt % of cerium oxide and about 0.5 to 2 wt % of the diutan gum, each by weight of the water in the heavy weight liquid additive.

7. The method of claim 1, wherein the heavy weight liquid additive comprises about 300 to about 500 wt. % of manganese oxide and 0.5 to 2 wt % of the diutan gum, each by weight of the water in the heavy weight liquid additive.

8. The method of claim 1, wherein the liquid additive further comprises a retarder, accelerator, fluid loss additive, foam preventer, or a buffering agent.

9. The method of claim 1, wherein the base cement slurry is not directly blended with any solid additive.

10. The method of claim 1, wherein the cementing composition has a density of about 11 to about 18 ppg.

11. The method of claim 1, wherein the cementing composition has a temperature stability range of about 40° C. to about 350° C.

12. A method of cementing a wellbore penetrating a subterranean formation, the method comprising:
   blending a base cement slurry with one or more liquid additives to provide a cementing composition, the base cement slurry comprising
a liquid carrier;
a class G cement or a combination of a class G and class C cements;
silica fume, or fumed silica, or a combination of silica fume and fumed silica,
the base cement slurry having a density of 14 to 16 ppg; and
injecting the cementing composition into the wellbore;
wherein the one or more liquid additives comprise a light weight liquid additive comprising (1) about 30 to about 50 wt % of a glass sphere, (2) about 0.5 to about 2 wt % of a diutan gum, and (3) water by weight of the water in the light weight liquid additive, the liquid weight liquid additive having a density of 5 to 7.

13. The method of claim 12, wherein the glass sphere is a borosilicate glass sphere.

14. A method of cementing a wellbore penetrating a subterranean formation, the method comprising:
blending a base cement slurry with one or more liquid additives to provide a cementing composition,
the base cement slurry comprising
a liquid carrier;
a class G cement or a combination of a class G and class C cements;
about 1 to about 10 wt % of kaolinite clay,
about 3 to 7 wt % of silica fume, or fumed silica, or a combination of silica fume and fumed silica,
the base cement slurry having a density of 14 to 16 ppg; and
injecting the cementing composition into the wellbore,
wherein the one or more liquid additives comprise a silica suspension liquid additive which comprises (1) 20 to 40 wt % of silica flour, (2) 20 to 40 wt % of silica sand, (3) a diutan gum, and (4) 20 to 40 wt % % water each based on the total weight of the silica suspension liquid additive.

15. The method of claim 14, wherein the base cement slurry is free of silica sand and silica flour; and the base cement slurry is blended with the silica suspension liquid additive in an amount such that the cementing composition has a target cement performance in a high temperature well environment.

* * * * *